United States Patent [19]

Beukema

[11] Patent Number: 5,727,026
[45] Date of Patent: Mar. 10, 1998

[54] METHOD AND APPARATUS FOR PEAK SUPPRESSION USING COMPLEX SCALING VALUES

[75] Inventor: Troy Beukema, Grand Haven, Mich.

[73] Assignee: Motorola, Inc., Schaumburg, Ill.

[21] Appl. No.: 559,407

[22] Filed: Nov. 15, 1995

[51] Int. Cl.$^6$ .................................... H04L 25/03
[52] U.S. Cl. .............................. 375/296; 332/159
[58] Field of Search ........................ 375/296, 295, 375/232, 229; 332/159, 123

[56] References Cited

U.S. PATENT DOCUMENTS

| | | | |
|---|---|---|---|
| 5,287,387 | 2/1994 | Birchler | 375/296 |
| 5,381,449 | 1/1995 | Jasper et al. | 375/298 |
| 5,621,762 | 4/1997 | Miller et al. | 375/298 |
| 5,638,403 | 6/1997 | Birchler et al. | 375/296 |

*Primary Examiner*—Stephen Chin
*Assistant Examiner*—Betsy L. Deppe
*Attorney, Agent, or Firm*—Susan L. Lukasik

[57] ABSTRACT

A method of peak suppression includes buffering (401) a plurality of modulation samples, yielding a plurality of buffered samples. A peak sample is determined (403) from among the plurality of buffered samples. A complex scaling value is determined (405). A plurality of waveform values is established (407). The plurality of waveform values is multiplied (409) by the complex scaling value, yielding a plurality of alteration values. The plurality of alteration values is combined (411) with the plurality of buffered samples, yielding a plurality of peak suppressed samples.

12 Claims, 2 Drawing Sheets

5,727,026

1

METHOD AND APPARATUS FOR PEAK SUPPRESSION USING COMPLEX SCALING VALUES

FIELD OF THE INVENTION

This invention relates to clipping of signals transmitted on radio frequencies (RF), including but not limited to clipping with low RF splatter.

BACKGROUND OF THE INVENTION

In a linear radio communication system, the peak-to-average ratio (i.e., the ratio of the peak signal power to the average power of the signal) of a communication signal is of critical importance to the cost, complexity, and size of the radio's linear power amplification system. Seemingly small reductions in peak-to-average ratio can have a significant impact on each of the above-mentioned system characteristics, which is especially true for systems that require high output power, such as a base station.

A problem in the design of linear power amplifiers is the effect of the transmitted signal's peak-to-average ratio on performance. As the peak-to-average ratio (PAR) increases, the attenuation needed for adequate splatter performance of the power amplifier increases proportionally. Therefore, it is highly desirable to control the PAR of the signal input to the amplifier. However, any attempt to reduce the nominal PAR through other than linear processing functions (i.e., non-linear signal processing) generates splatter. Splatter, which is signal energy that extends beyond the frequency band allocated to a signal, is highly undesirable because it interferes with communications on adjacent channels.

One method of reducing PAR is hard clipping, which reduces each signal value exceeding a clip threshold to a predetermined magnitude, often the threshold magnitude. Hard-clipping causes significant splatter due to the abrupt nature of its operation.

Another method of reducing PAR is a "soft" algorithm that applies the desired signal to a non-linear device that limits signal peaks. A significant proportion of the input samples must be altered, which may add significant signal distortion and cause significant energy to be splattered into adjacent channels.

In the case of a low splatter design for peak suppression, the desired frequency domain response is confined as much as possible to the modulation bandwidth. This confinement minimizes energy splattered into an adjacent channel, but confines most of the peak suppression energy to the modulation bandwidth, thereby increasing signal distortion.

In the case of a low signal distortion design for peak suppression, the frequency domain response may allow significant energy outside of the modulation bandwidth. This process removes some fraction of the peak suppression energy from the modulation bandwidth and lowers signal distortion, but increases adjacent channel splatter.

Therefore, a method of effective peak-to-average ratio control with control over the amount of generated splatter and/or signal distortion is desired.

DESCRIPTION OF A PREFERRED EMBODIMENT

Figure 1:
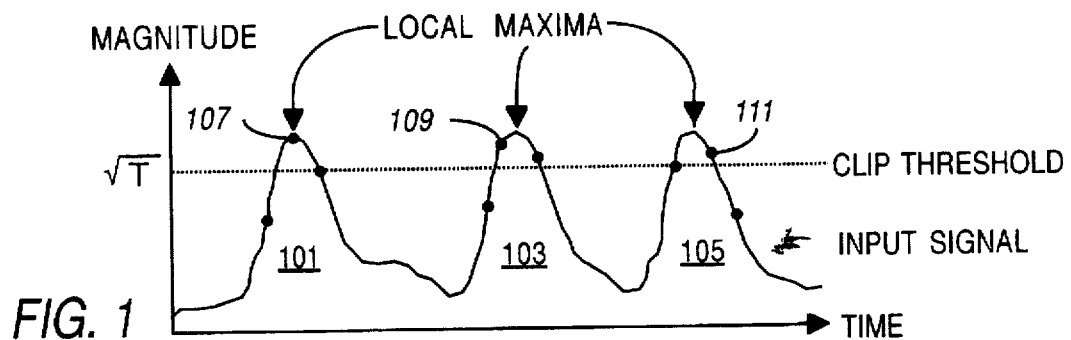
FIG. 1 is a timing diagram of an input signal in accordance with the invention.

The following describes an apparatus for and method of providing effective peak-to-average ratio control without the generation of significant splatter and/or signal distortion. By limiting the peak power output of a non-constant envelope modulation while maintaining control of the energy bandwidth of the limited signal, peak suppression above a known threshold is provided without the generation of significant splatter and/or signal distortion.

An apparatus for outputting a plurality of peak-suppressed samples includes a buffer 219, 223, 227, 231, and 235, arranged and constructed to receive a plurality of modulated samples and a plurality of altered samples and to output a plurality of peak-suppressed samples and a plurality of non-peak-suppressed samples. A first logic section 205 is operably coupled to the buffer and is arranged and constructed to receive the plurality of non-peak-suppressed samples and to output a plurality of waveform values. A second logic section 217 is operably coupled to the buffer and is arranged and constructed to receive at least one of the plurality of non-peak-suppressed samples and to output a complex scaling value. A plurality of multipliers 207, 209, 211, 213, and 215 is operably coupled to the first logic section and the second logic section. The plurality of multipliers 207, 209, 211, 213, and 215 is arranged and constructed to receive the plurality of waveform values and the complex scaling value and to output a plurality of alteration values. A plurality of adders 221, 225, 229, 233, and 237 is operably coupled to the plurality of multipliers and the buffer. The plurality of adders is arranged and constructed to receive the plurality of alteration values and to output the plurality of altered samples. In the preferred embodiment, the buffer, the first logic section, the second logic section, the plurality of multipliers, and the plurality of adders are disposed in a radio.

A timing diagram of an input signal is shown in FIG. 1. Because any signal value above the clip threshold, √T, causes a power amplifier to operate in its non-linear region, thereby resulting in splatter, the maximum signal input to the power amplifier is clipped to the value of the clip threshold, √T. In the preferred embodiment, samples are taken of the input signal at regular, or periodic, intervals. The timing diagram of FIG. 1 shows three peaks 101, 103, and 105, and three samples designated by a * are shown during each peak. Only three samples are shown for the sake of simplicity of the drawing, although samples may be continuously taken on the input signal, including between the peaks, as is known in the art. The local maximum of each of the peaks 101, 103, and 105 is above the clip threshold. A local maximum is the highest magnitude of a peak of the input signal.

Because digital sampling of a signal takes place over a fixed time period, it is possible that the sampling will not coincide with a local maximum of every peak. The first peak 101 shown in FIG. 1 has a peak sample 107 that coincides with the local maximum of the first peak 101. The second peak 103 has a peak sample 109 that precedes the local maximum of the second peak 103 in time. The third peak has a local maximum which precedes the peak sample 111 of the third peak 105 in time. Therefore, the magnitude of the local maxima of the second and third peaks 103 and 105 is greater than the magnitude of the highest magnitude sample 109 and 111 found for these peaks. Because it is desired for the local maximum of a peak to be below the clipped threshold, peak suppression must be applied in such a way that the local maximum, rather than the peak sample, be taken into account to insure that the resultant signal falls below the clip threshold, especially when the peak sample 109 or 111 is not as high in magnitude as the local maximum of the peak. If the local maximum is not considered when suppressing peaks, this particular peak will not be sufficiently suppressed, therefore values above the clip threshold will arise, resulting in splatter.

Figure 2:
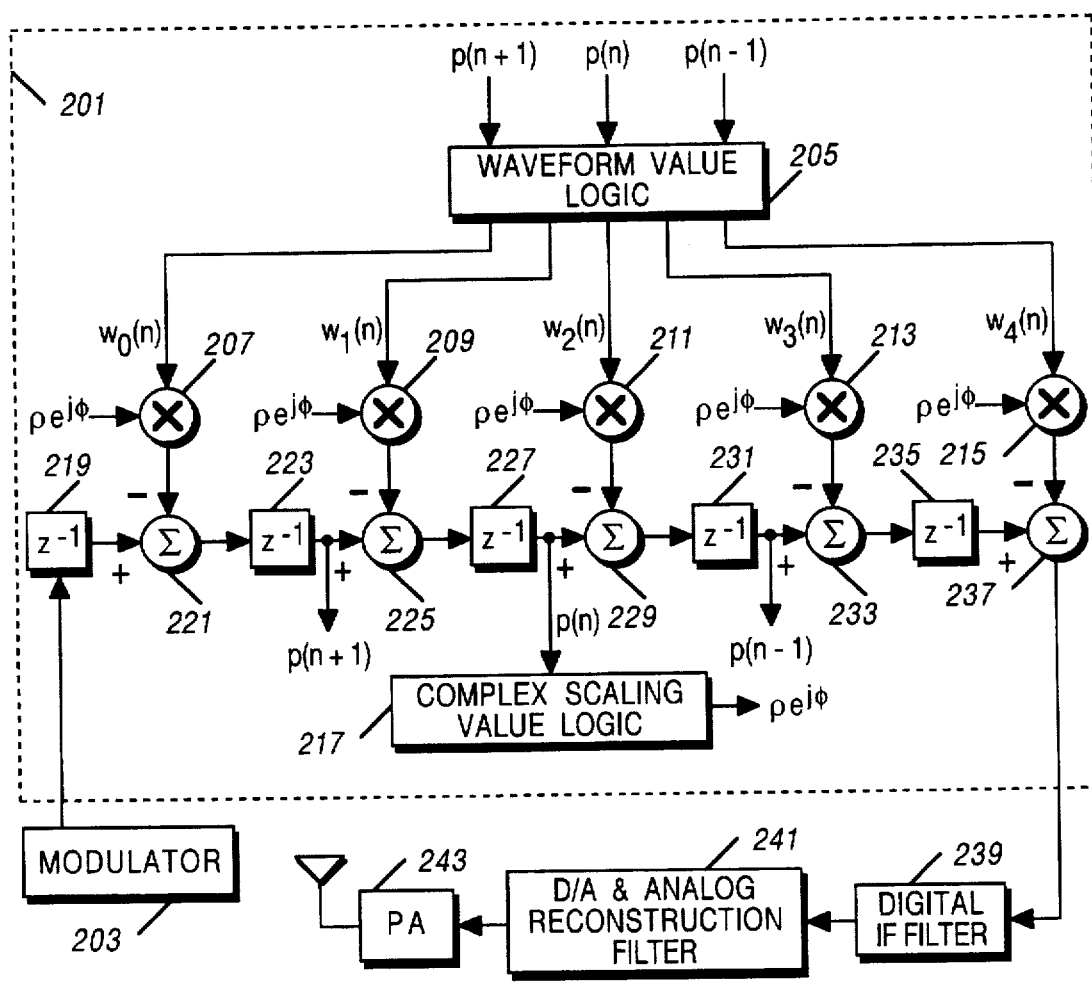
FIG. 2 is a block diagram of a communication unit with a peak suppressor in accordance with the invention.

A block diagram of a communication unit with a peak suppressor is shown in FIG. 2. A peak suppressor 201 receives samples of an input signal from a modulator 203. In the preferred embodiment, this modulator performs multiple-subband quadrature amplitude modulation (MQAM). These modulation samples are input to the peak suppressor 201 at a first unit delay buffer 219. A waveform value logic block 205 receives p(n+1), p(n), and p(n−1) as inputs. The waveform value logic block 205 determines from these three inputs what type of waveform should be combined with the modulation samples from the modulator 203 to yield a peak suppressed output signal from the peak suppressor 201.

The output of the waveform value logic block 205 consists of a plurality of waveform values that were established by the waveform value logic 205. Only five waveform values are shown in FIG. 2 for the sake of simplicity of the drawing, although successful implementation of the present invention may be provided by using 5, 7, 9, 11, 13, 15, 17, and so forth, waveform values, as desired for a particular signal. The waveform values $w_0(n)$, $w_1(n)$, $w_2(n)$, $w_3(n)$, and $w_4(n)$, are input to a bank of multipliers 207, 209, 211, 213, and 215.

The waveform values, $w_0(n)$, $w_1(n)$, $w_2(n)$, $w_3(n)$, and $w_4(n)$, are chosen to represent a time domain waveform with center tap value, $w_2(n)$, normalized to a value of 1.0. The remaining tap values, $w_0(n)$, $w_1(n)$, $w_3(n)$, and $w_4(n)$, are chosen such that the frequency domain response of the resulting time domain waveform described by the sequence $\{w_0(n), w_1(n), \ldots, w_4(n)\}$ reflects desired power spectrum characteristics. In the preferred embodiment, the center tap value, $w_2(n)$, corresponds to the continuous time (i.e., analog equivalent) peak of the waveform. In the preferred embodiment, the waveform is a symmetric, linear phase waveform with group delay equal to $(N-1)/2$, where N is the length of the waveform. Examples of waveform value sets are provided in the tables set forth below. Included in these tables are four sets of waveform values: a 9-value set yielding higher splatter and low signal distortion, a 9-value set yielding medium splatter and medium distortion in the output signal; a 9-value set yielding low splatter and higher distortion in the output signal; and a 17-value set yielding passband noise shaping and low distortion in the output signal. In the preferred embodiment, the 17-value set of waveform values provides explicit noise shaping control of the power envelope of the destructive summation vector sequence (i.e., the alteration values) and provides more control of the splatter versus signal degradation trade-off at a given peak clip level.

The computation of waveform values, $w_0(n)$, $w_1(n)$, $w_2(n)$, $w_3(n)$, and $w_4(n)$, given a desired frequency response shape, is accomplished by any of a number of filter design algorithms which are well established in the art. One of the simplest filter design algorithms is the frequency sampling technique, wherein the time domain waveform is computed by an inverse discrete Fourier transform (IDFT) of the specified frequency domain points. Other more complicated filter design techniques such as least mean squares or mini-max error approximation may be used to generate the waveform values.

Once the above set of waveform values is generated, two auxiliary sets of waveform values are produced from the above set of waveform values in accordance with the preferred embodiment. The original set of waveform values, as described above, is considered the primary (or centered) set of waveform values in the preferred embodiment. The two auxiliary sets of waveform values are computed by delaying and advancing the centered waveform values by ½ sample, then normalizing the center value of the respective time shifted waveforms to a value of 1.0. One auxiliary set of waveform values, called a delayed set of waveform values, is computed by delaying each of the primary (or centered) waveform values by ½ sample, then normalizing the center value of the respective time-shifted set of waveform values to a value of 1.0. A second auxiliary set of waveform values, called an advanced set of waveform values, is computed by advancing the primary (or centered) waveform values by ½ sample, then normalizing the center value of the respective time-shifted set of waveform values to a value of 1.0. In addition, many more sets of waveform values could be computed to more accurately line up the waveform peak with the actual local maximum of the modulation signal peak. Alternatively, the step of combining the waveform values with the modulation samples may incorporate a variable time shift depending on where the actual local maximum can be found with respect to a sampled peak.

Figure 3:
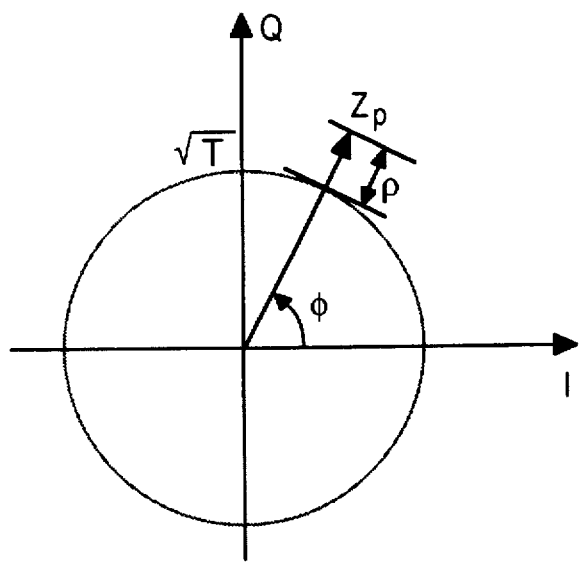
FIG. 3 is a vector diagram of an input signal in accordance with the invention.

The waveform values, $w_0(n)$, $w_1(n)$, $w_2(n)$, $w_3(n)$, and $w_4(n)$, are each multiplied by the complex scaling factor $\rho e^{j\phi}$, which complex scaling value is determined by a complex scaling value logic block 217. The complex scaling value logic block 217 determines the factor $\rho e^{j\phi}$ by using the vector (complex) value, $Z_p$, which represents the particular sample whose magnitude is greater than $\sqrt{T}$. The angle of $Z_p$ is $\phi$, and $\rho$ is the difference between the magnitude of $Z_p$ and $\sqrt{T}$, the clip threshold, as shown in FIG. 3. In the preferred embodiment, $$\rho e^{j\phi} = \frac{Z_p}{|Z_p|} (|Z_p| - \sqrt{T}).$$

In the preferred embodiment, $Z_p = p(n)$, the peak sample. Alternatively, $Z_p$ would be the actual local maximum of the peak and would be computed if the peak sample, p(n), is not the same as the actual local maximum of the peak. In this alternative case, the waveform values would be appropriately altered in time and magnitude such that the continuous time maximum of the waveform values corresponds in time to the actual local maximum of the peak.

When the peak sample of the modulator samples is at the center buffer unit 227 of the buffer 219, 223, 227, 231, 235 of the peak suppressor, the results of the multipliers 207, 209, 211, 213, and 215, referred to as alteration values, are subtracted from the modulation samples by a plurality of adders 221, 225, 229, 233, and 237. In the preferred embodiment, the buffer 219, 223, 227, 231, 235 is a multiple stage buffer that is capable of storing the number of samples equal to the number of waveform values applied. In the preferred embodiment, the output of the final adder 237 is input to a digital intermediate frequency filter 239, which outputs the signal to a digital to analog (D/A) converter and analog reconstruction filter 241, which outputs the signal to a power amplifier 243 for transmission through an antenna, as is known in the art. In the preferred embodiment, the digital intermediate frequency filter 239, the analog construction filter 241, the power amplifier 243 and antenna are part of a communication unit, such as an RF portable or mobile radio or a base station. The output of the center buffer 227 is p(n), which is the peak sample 107, in vector or complex value form, of a peak 101. The two adjacent samples to the peak sample are p(n+1) and p(n−1) which are found at the adjacent buffers 223 and 231 of the peak suppressor 201. These three samples p(n+1), p(n), and p(n−11) are input to the waveform value logic block 205, as previously described. The peak sample p(n) is input to the complex scaling value logic block 217, which determines the maximum magnitude of the peak 101 to determine the complex scaling value $\rho e^{j\phi}$.

The complex scaling value will be altered if the local maximum of the peak 103 or 105 is not the same as the peak sample 109 or 103 of the particular peak 103 or 105. In the preferred embodiment, the complex scaling value is $$(1.05)\frac{Z_p}{|Z_p|}(|Z_p|-\sqrt{T})$$

where the local maximum of the peak 103 or 105 is not the same as the peak sample 109 or 103 of the particular peak 103 or 105. In the preferred embodiment, the local maximum of the peak 103 or 105 is not the same as the peak sample 109 or 111 of the particular peak 103 or 105 when $|p(n+1)|>|p(n-1)|$ and $|p(n+1)|^2>(0.8)|p(n)|^2$, as is the case for the second peak 103 of FIG. 1, or $|p(n-1)|>|p(n+1)|$ and $|p(n-1)|^2>(0.8)|p(n)|^2$, as is the case for the third peak 105 of FIG. 1, where p(n+1) is the sample in time after the peak sample, p(n), or $Z_p$, is the peak sample, and p(n−1) is the sample in time before the peak sample.

In the preferred embodiment, if the peak sample is not the local maximum of the peak 103 or 105, the alteration waveform is delayed or advanced in time as appropriate, such that the continuous time peak of the alteration waveform moves closer in time to the local maximum of the modulation. In the preferred embodiment, if a peak such as the second peak 103 of FIG. 1 appears, where the peak sample 109 precedes the local maximum of the peak 103, then an alteration waveform that is delayed in time one-half sample from the centered alteration waveform is chosen. In other words, the delayed set of waveform values described above is chosen to be appropriately combined with the modulation samples. This type of peak is found in the preferred embodiment when $|p(n+1)|>|p(n-1)|$ and $|p(n+1)|^2>(0.8)|p(n)|^2$.

Also in the preferred embodiment, if a peak such as the third peak 105 of FIG. 1 appears, where the local maximum of the peak 105 precedes the peak sample 111, then an alteration waveform that is advanced in time one-half sample from the centered alteration waveform is chosen. In other words, the advanced set of waveform values described above is chosen to be appropriately combined with the modulation samples. This type of peak is found in the preferred embodiment when $|p(n-1)|>|p(n+1)|$ and $|p(n-1)|^2>(0.8)|p(n)|^2$.

If the local maximum and the peak sample are the same, as is the case with the first peak 101 of FIG. 1, then the primary set of waveform values is combined with modulation samples, and there is no delay or advance of the alteration waveform values. In other words, if the relationship between samples p(n+1), p(n), and p(n−1) is such that neither the advanced set of waveform values nor the delayed set of waveform values is chosen, then the primary set of waveform values is chosen for combination with the modulation samples.

Figure 4:
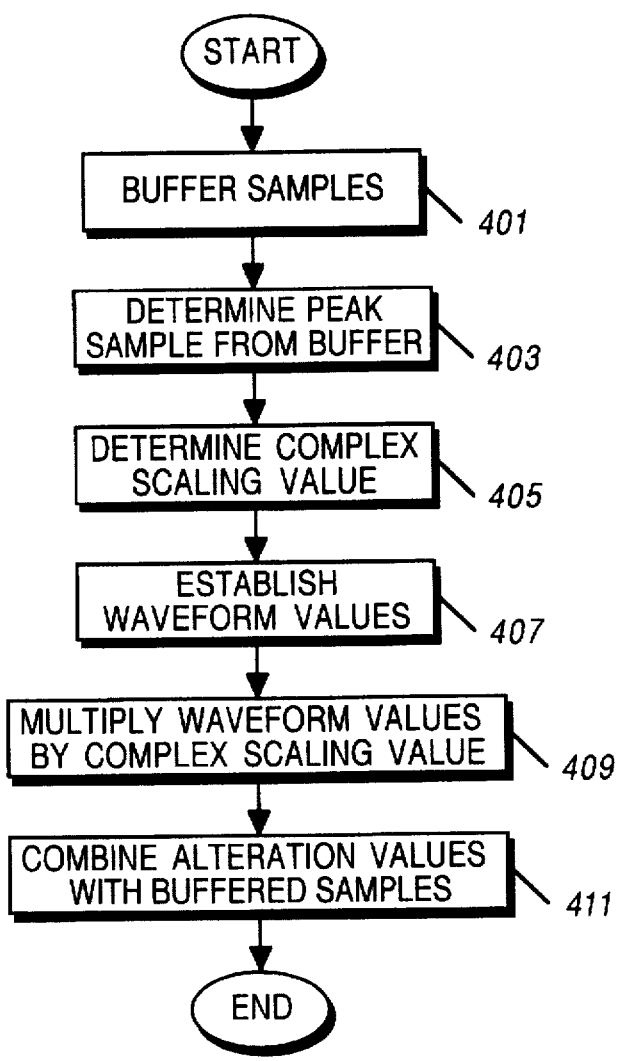
FIG. 4 is a flowchart showing peak suppression in accordance with the invention.

A flow chart showing peak suppression in accordance with the invention is shown in FIG. 4. At step 401, samples are buffered from a modulator output. At step 403, a peak sample is determined from among the buffered samples. A peak sample, p(n), occurs when $|p(n-1)| \leq |p(n)| \geq |p(n+1)|$.

This determination includes determining what type of peak, i.e., whether the local maximum of the peak is before, after, or at the peak sample. At step 405, a complex scaling value is determined by the complex scaling value logic 217. At step 407, waveform values are established by the waveform value logic 205. If $|p(n)| \leq \sqrt{T}$, then all waveform values are zero. If $|p(n)| > \sqrt{T}$, i.e., a peak above the threshold is detected, then the waveform values are chosen as one of the sets of waveform values described above. At step 409, the waveform values are multiplied by the complex scaling value yielding a plurality of alteration values. When the alteration values and the buffered samples, i.e., the modulation samples, are appropriately aligned in time, depending on the type of peak determined at step 403, then the alteration values are combined with the buffered samples, thereby yielding peak suppressed samples.

Thus, a detected peak in the modulation stream is suppressed by using linear coherent destructive vector summation of the modulation in the vicinity of a power peak with a predetermined waveform whose energy is shaped/constrained to lie within a predetermined desired bandwidth and is designed with a high peak/average power ratio.

The primary advantage of the present method of peak suppression over other methods of peak suppression that are known in the art, is the achievement of peak suppression through a linear, or additive, operation on the signal waveform. Prior methods use nonlinear multiplicative operations applied directly to the signal waveform to limit the signal peak. Such techniques do not provide precise control of the power spectrum of the limited signal. The present method offers more control over the power spectrum of the peak suppressed waveform. The power spectrum may be confined to the signal bandwidth for minimum adjacent channel splatter. The power spectrum may also be allowed to exceed the signal bandwidth by a prescribed amount, thereby reducing signal distortion due to peak suppression. In addition, the present method provides that the power spectrum of the peak suppression distortion may be shaped within the signal bandwidth, thereby lowering signal distortion for certain modulation types while simultaneously confining the splatter bandwidth to desired prescribed limits.

| WIDER SPLATTER, LOWER DISTORTION WAVEFORM VALUES | | | | | | | | | |
|---|---|---|---|---|---|---|---|---|---|
| Delay | $w_1$ | $w_2$ | $w_3$ | $w_4$ | $w_5$ | $w_6$ | $w_7$ | $w_8$ | $w_9$ |
| −½ | 0.148 | −0.171 | −0.0466 | 1.0 | 1.0 | −0.0466 | −0.171 | 0.148 | 0.0587 |
| 0 | 0.110 | 0.0213 | −0.209 | 0.370 | 1.0 | 0.370 | −0.209 | 0.0213 | 0.110 |
| ½ | 0.0587 | 0.148 | −0.171 | −0.0466 | 1.0 | 1.0 | −0.0466 | −0.171 | 0.148 |

| MEDIUM SPLATTER, MEDIUM DISTORTION WAVEFORM VALUES | | | | | | | | | |
|---|---|---|---|---|---|---|---|---|---|
| Delay | $w_1$ | $w_2$ | $w_3$ | $w_4$ | $w_5$ | $w_6$ | $w_7$ | $w_8$ | $w_9$ |
| −½ | 0.0915 | −0.248 | 0.128 | 1.0 | 1.0 | 0.128 | −0.243 | 0.0915 | 0.0525 |
| 0 | 0.102 | −0.0633 | −0.178 | 0.528 | 1.0 | 0.528 | −0.178 | −0.0633 | 0.102 |
| ½ | 0.0525 | 0.0915 | −0.243 | 0.128 | 1.0 | 1.0 | 0.128 | −0.243 | 0.0915 |

| LOW SPLATTER, HIGHER DISTORTION WAVEFORM VALUES | | | | | | | | | |
|---|---|---|---|---|---|---|---|---|---|
| Delay | $w_1$ | $w_2$ | $w_3$ | $w_4$ | $w_5$ | $w_6$ | $w_7$ | $w_8$ | $w_9$ |
| −½ | −0.204 | −0.197 | 0.821 | 1.0 | 1.0 | 0.821 | −0.197 | −0.204 | −0.0329 |
| 0 | −0.0973 | −0.227 | −1.58E−4 | 0.621 | 1.0 | 0.621 | −1.58E−4 | −0.227 | −0.0973 |
| ½ | −0.0329 | −0.204 | −0.197 | 0.321 | 1.0 | 1.0 | 0.321 | −0.197 | −0.204 |

| PASSBAND SHAPING, LOW DISTORTION WAVEFORM VALUES | | | | | | | | | |
|---|---|---|---|---|---|---|---|---|---|
| Delay | $w_1$ | $w_2$ | $w_3$ | $w_4$ | $w_5$ | $w_6$ | $w_7$ | $w_8$ | $w_9$ |
| −½ | 0.352 | 0.171 | −0.286 | −0.00518 | 0.238 | −0.251 | −0.104 | 1.0 | 1.0 |
| 0 | 0.188 | 0.276 | −0.0590 | −0.168 | 0.166 | 0.0284 | −0.290 | 0.359 | 1.0 |
| ½ | 0.0866 | 0.352 | 0.171 | −0.236 | −0.00518 | 0.238 | −0.251 | −0.104 | 1.0 |

| PASSBAND SHAPING, LOW DISTORTION WAVEFORM VALUES, cont'd | | | | | | | | |
|---|---|---|---|---|---|---|---|---|
| Delay | $w_{10}$ | $w_{11}$ | $w_{12}$ | $w_{13}$ | $w_{14}$ | $w_{15}$ | $w_{16}$ | $w_{17}$ |
| −½ | −0.104 | −0.251 | 0.238 | −0.00518 | −0.236 | 0.171 | 0.352 | 0.0866 |
| 0 | 0.359 | −0.290 | 0.0284 | 0.166 | −0.168 | −0.0590 | 0.276 | 0.188 |
| ½ | 1.0 | −0.104 | −0.251 | 0.238 | −0.00518 | −0.236 | 0.171 | 0.352 |

What is claimed is:

1. A method comprising the steps of:
   buffering a plurality of modulation samples, yielding a plurality of buffered samples, wherein one of the plurality of buffered samples is a peak sample;
   determining a complex scaling value;
   establishing a plurality of waveform values;
   multiplying the plurality of waveform values by the complex scaling value, yielding a plurality of alteration values; and
   combining the plurality of alteration values with the plurality of buffered samples, yielding a plurality of peak suppressed samples.

2. The method of claim 1, wherein the complex scaling value is $\rho e^{j\phi}$, where $\rho$ is the difference between the magnitude of the peak sample and a threshold, and $\phi$ is the angle of the peak sample.

3. The method of claim 2, wherein:

$$\rho e^{j\phi} = \frac{Z_p}{|Z_p|} (|Z_p| - \sqrt{T}),$$

where $Z_p$ is a complex value representing the peak sample and $\sqrt{T}$ is the threshold.

4. The method of claim 1, further comprising the step of determining whether the peak sample is a local maximum.

5. The method of claim 4, further comprising the step of increasing the magnitude of the complex scaling value if the peak sample is not a local maximum.

6. The method of claim 1, further comprising the step of adjusting the plurality of waveform values by delaying the plurality of waveform values in time by ½ sample when the peak sample precedes a local maximum in time.

7. The method of claim 1, further comprising the step of adjusting the plurality of waveform values by advancing the plurality of waveform values in time by ½ sample when a local maximum precedes the peak sample in time.

8. The method of claim 1, wherein the step of combining comprises subtracting the plurality of alteration values from the plurality of buffered samples to yield the plurality of peak suppressed samples.

9. The method of claim 1, wherein the step of combining comprises linear coherent destructive vector summing of the modulation samples in the vicinity of a peak.

10. The method of claim 1, wherein the step of establishing provides noise shaping control of a power envelope of the alteration values.

11. An apparatus comprising:
   a buffer, arranged and constructed to receive a plurality of modulated samples and a plurality of altered samples and to output a plurality of peak-suppressed samples and a plurality of non-peak-suppressed samples;
   a first logic section, operably coupled to the buffer and arranged and constructed to receive the plurality of non-peak-suppressed samples and to output a plurality of waveform values;
   a second logic section, operably coupled to the buffer and arranged and constructed to receive at least one of the plurality of non-peak-suppressed samples and to output a complex scaling value;

a plurality of multipliers, operably coupled to the first logic section and the second logic section, the plurality of multipliers arranged and constructed to receive the plurality of waveform values and the complex scaling value and to output a plurality of alteration values;

a plurality of adders, operably coupled to the plurality of multipliers and the buffer, the plurality of adders arranged and constructed to receive the plurality of alteration values and to output the plurality of altered samples.

12. The apparatus of claim 11, wherein the buffer, the first logic section, the second logic section, the plurality of multipliers, and the plurality of adders are disposed in a radio.

* * * * *